United States Patent
Riordan

[15] 3,643,436
[45] Feb. 22, 1972

[54] INTEGRATING HYDRAULIC BRAKE BOOSTER

[72] Inventor: Hugh E. Riordan, Ann Arbor, Mich.
[73] Assignee: Kelsey-Hayes Company, Romulus, Mich.
[22] Filed: Sept. 22, 1969
[21] Appl. No.: 859,777

[52] U.S. Cl. ................................60/54.6 P, 60/54.6 P
[51] Int. Cl. .........................................................F15b 7/00
[58] Field of Search .................251/38, 44; 60/54.5 P, 54.6 P

[56] References Cited

UNITED STATES PATENTS

| 1,651,689 | 12/1927 | Freeze | 251/44 |
| 2,689,706 | 9/1954 | Carlson | 251/38 |
| 2,164,760 | 7/1939 | Wesson | 251/44 |
| 3,148,592 | 9/1964 | Schultz et al. | 60/54.6 P |
| 3,298,177 | 1/1967 | Kellogg | 60/54.5 P |
| 3,327,479 | 6/1967 | Harness et al. | 60/54.6 P |

FOREIGN PATENTS OR APPLICATIONS

| 722,521 | 11/1965 | Canada | 60/54.6 P |

Primary Examiner—Edgar W. Geoghegan
Assistant Examiner—A. M. Zupcic
Attorney—Harness, Dickey & Pierce

[57] ABSTRACT

A power booster for a brake system in which input force and input displacement hysteresis relative to output pressure is avoided or minimized.

10 Claims, 1 Drawing Figure

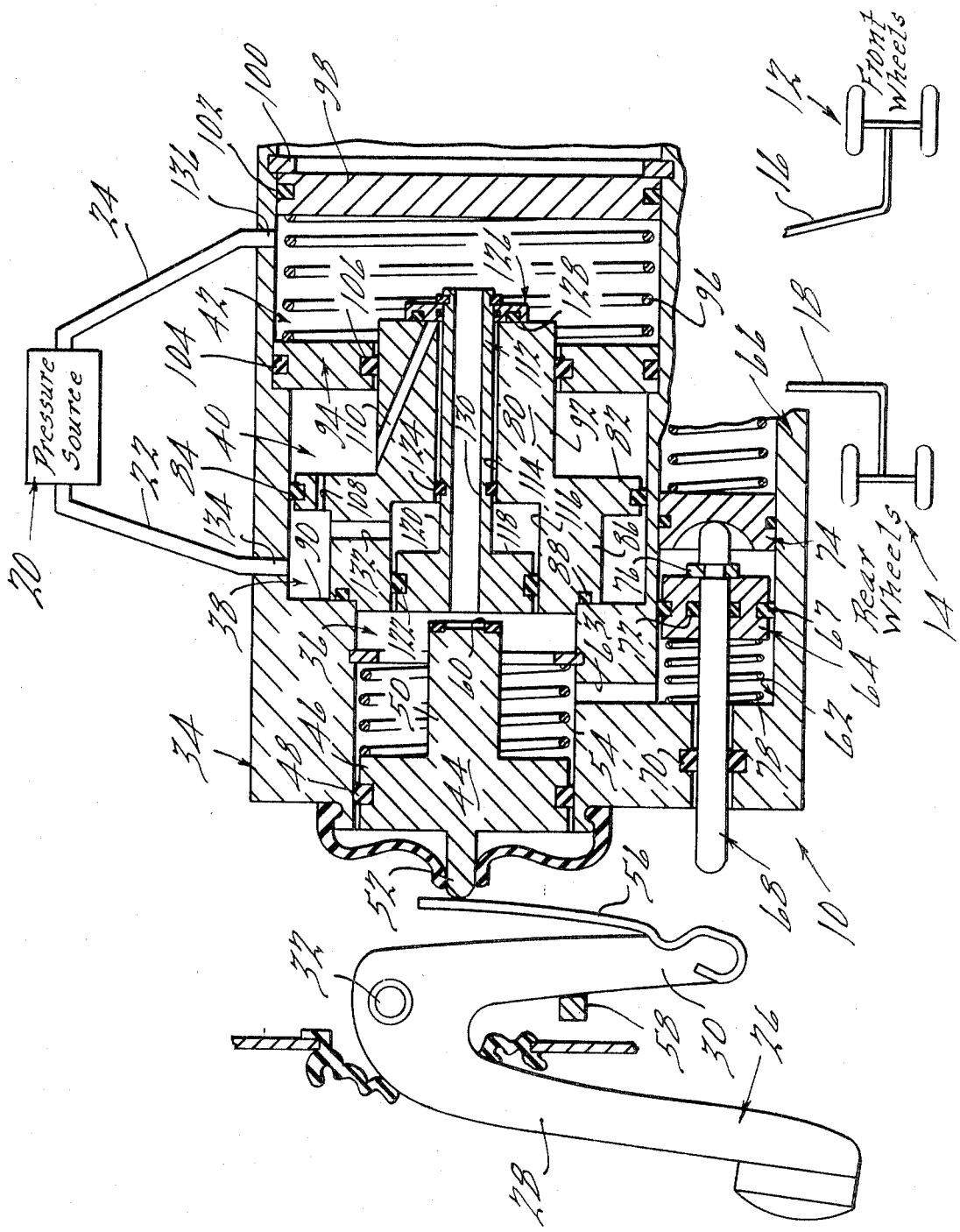

INTEGRATING HYDRAULIC BRAKE BOOSTER

SUMMARY BACKGROUND OF THE INVENTION

The present invention relates to power boosters for brake systems.

In conventional power boosters output pressure is normally a function of displacement of a pilot valve and input force resulting from pressure feedback. Because of friction in the system the relationship between displacement and input force and output pressure will be different for increasing displacement and force and decreasing displacement and force. This difference can be considered as hysteresis. It is desirable to avoid such hysteresis and in the present invention this is done in a booster using hydraulic power by incorporating time integration in the pilot valve motion.

Therefore it is an object of the present invention to provide a novel brake booster utilizing time integration in the pilot valve motion whereby hysteresis of input displacement and input force with output pressure is eliminated or minimized.

It is another object to provide a novel brake booster which provides for manual operation of the brakes in the event of a power failure.

It is another general object of the present invention to provide a novel brake booster.

Other objects, features, and advantages of the present invention will become apparent from the subsequent description and the appended claims taken in conjunction with the accompanying drawing.

The FIG. is a partial schematic drawing with some parts shown in section of apparatus embodying features of the present invention.

Looking now to the drawing, a booster 10 is shown to be connected to front and rear brake systems 12 and 14 via fluid lines 16 and 18, respectively. Booster 10 is energized from a source of hydraulic pressure 20 having a pressurized outlet 22 and a return 24. The booster 10 is actuated via a foot pedal 26 which has a foot application leg portion 28 connected to a booster application leg portion 30 to define an inverted V pivotally supported at its apex 32.

The booster 10 includes a valve housing 34 which has a central cavity defining a plurality of coaxially extending chambers 36, 38, 40 and 42. A pressure feedback piston 44 is slidably supported in chamber 36. The piston 44 has a head portion 46 which carried an annular seal 48 which provides a seal with the wall of chamber 36. Stem portions 50 and 52 extend inwardly and outwardly, respectively, from head portion 46. A coil spring assembly 54 engages the head portion 46 and normally urges the piston 44 outwardly from chamber 36 with stem portion 52 being urged into engagement with input leaf spring 56 which is secured to the booster application leg portion 30 of foot pedal 26 causing pedal 26 to be pivoted to its deactuated position-engaging pedal stop 58. An annular seal 60 is supported at the extreme inner end of inner stem portion 50. The chamber 36 is in direct communication, via passage 63, with a booster chamber 62 which houses a booster piston 64 for sliding action. An annular seal 67 seals opposite sides of piston 64 in chamber 62; the booster piston 64 actuates a master cylinder assembly 66, which can be a dual master cylinder generally of a conventional construction. Fluid lines 16 and 18 are connected to master cylinder assembly 66 whereby the brakes for the front and rear wheels can be actuated. A mechanical override plunger 68 is slidably supported in piston 64 and housing 34 and is appropriately sealed by seals 70 and 72. The plunger 68 acts on an actuating piston 74 in master cylinder assembly 66 and booster piston 64 acts on master cylinder piston 74 through snapring 76 secured to plunger 68. A light spring 78 normally holds booster piston 64 against the ring 76. Thus fluid pressure in chamber 36 also appears in booster chamber 62 and acts on booster piston 64.

A control valve 80 is slidably supported, via a flange portion 82, in the chambers 38 and 40 which are of the same diameter which is larger than that of chamber 36. A seal 84 in portion 82 separates the chambers 38 and 40.

The control valve 80, which functions as a throttle valve, has a forward portion 86 which extends into chamber 38 and has a seal 88 which sealingly engages the shoulder 90 of chamber 38 to normally seal chamber 38 from chamber 36. The control valve 80 has a rearward portion 92 which extends through chamber 40 and into chamber 42. A ring 94 separates chambers 40 and 42 and is held against the forward shoulder of chamber 42 by a spring 96 which acts against a cap 98 and retaining ring 100 located at the rearward end of chamber 42. The cap 98 and ring 94 are sealed at their outer extremities via seals 102 and 104, respectively. The rearward portion 92 extends through ring 94 and is sealed therewith via a seal 106. A bleed port 108, through the flange portion 82 communicates chambers 38 and 40. A pilot port 110 extends through rearward portion 92 to communicate chambers 40 and 42. This port 110 is normally closed by a pilot valve 112.

The control valve 80, which also functions as a throttle valve, has a through bore 114 which terminates at its forward end in a counterbore portion 116. The pilot valve 112 is slidably supported in bore 114 and has a head portion 118 in counterbore portion 116 and a rod portion 120 in the smaller diameter portion of bore 114. Seals 122 and 123 seal head portion 118 and rod portion 120, respectively. A valve seal ring 126 is fixed to the outer end of rod portion 120 and has a seal 128 which can overengage the rearward end of pilot port 110 to close that port. The pilot valve 112 has a through bore 130 which can communicate chambers 36 and 42. The seal 60 on feedback piston 44 can engage the forward end of head portion 118 of pilot valve 112 to block the forward end of bore 130. A passage 132 through the forward portion 86 of control valve 80 communicates counterbore 116 and chamber 38.

The pressure outlet line 22 from source 20 is connected to chamber 38 via port 134 while return line 24 is connected to chamber 42 via port 136. Prior to brake application chambers 38 and 40 and counterbore 116 will be at the high pressure from line 22 and chambers 36 and 42 and booster chamber 62 will be at the low pressure of return line 24; hence the master cylinder assembly 66 will not be actuated. Thus, prior to brake application, the pressure feedback piston 44, control valve 80, and pilot valve 112 are in the positions shown, which are established and held by differential pressure acting on differential piston areas in the case of the pilot valve 112 and control valve 80 and by the light spring 54 in the case of the pressure feedback piston 44. When the pedal 26 is depressed the pressure feedback piston 44 is moved until the seal 60 engages head portion 118 and bore 130 is closed. As the pedal is further depressed the pilot valve 112 is pushed to the right by the pressure feedback piston 44 opening the pilot port 110 and reducing the pressure in the control valve chamber 40. The pressure on chamber 40 will be reduced at a rate determined by the differential flow rate between the input through the pilot chamber bleed port 108 and the outflow through the pilot port 110. The rate of outflow from pilot port 110 will be controlled by the position of valve seal 126 which functions as a throttle valve. The control valve 80 will move to the right at a speed equal to the differential volume flow divided by the effective control valve piston area. As soon as the lap at the shoulder 90 is traversed, fluid will enter the pressure feedback chamber 36 and will flow to the booster chamber 62 displacing the booster piston 64 and applying the brake. As fluid pressure builds up in master cylinder assembly 66 the reaction force will retard the motion of the booster piston 64 causing pressure to increase in the booster cylinder 62 and in the pressure feedback chamber 36. This pressure causes a reaction to be transmitted to the brake pedal through spring 56. The reaction force on the pressure feedback piston 44 simultaneously causes it to move to the left as spring 56 is compressed. This causes the pilot valve 112 to move to the left towards a position closing the pilot valve port 110. As flow through port 110 is throttled, by valve seal 126, pressure increases in the chamber 40 causing the control valve 80 to move to the left at a rate proportional to the flow differential between the bleed port 108 and the pilot port 110, closing the control valve 80 (against shoulder 90) and holding booster pressure and hence booster effort at a level proportional to pedal effort.

When pedal effort is released the pressure feedback piston 44 moves to the left, opening the bore 130 and allowing booster pressure to decrease until equilibrium is again reached with pedal effort.

In the event of hydraulic power failure of supply 20, the pilot valve 112 and control valve 80 are free to move to the right so that the pedal 26 may be depressed far enough to permit direct application of the brakes through the mechanical override plunger 68.

With the valve assembly 10, as noted, hysteresis and/or lag between input force and displacement and output pressure is minimized. This can be seen from the following analysis in which the following terms apply:

| | |
|---|---|
| P | pressure to brakes from master cylinder assembly 64 |
| Ṗ | rate of change of pressure P |
| Ẋv | rate of change of Xv |
| Xv | displacement of control valve 80 |
| Xc | displacement of pilot valve 112 |
| Fi | input force at pedal 26 |
| Xi | input displacement of pedal 26 |
| k | spring rate of spring 56 |
| K1, K2, K3 | various constants |
| S1 | f (P) (Laplace transform) |
| S2 | f (P) (Laplace transform) |

The control valve 80 acts as a throttle valve such that the rate of flow into chamber 36 from chamber 38 will be a function of the displacement of the valve 80 away from shoulder 90; thus the rate of change of pressure at booster cylinder 62 and hence at master cylinder assembly 66 is proportional to the displacement of control valve 80 whereby: (1) $\dot{P}=K1Xv$.

Note that the rate of displacement of the control valve 80 is controlled by the differential flow rate from chambers 38 to 40 to 42. This will be controlled by valve 126 which also acts as a throttle valve whereby flow out from port 110 will be at a rate determined by the displacement of pilot valve 112 relative to control valve 80. Thus the rate of displacement of the control valve 80 is proportional to the difference in displacement between the control valve 80 and pilot valve 112, whereby: (2) $\dot{X}v=K2(Xc-Xv)$.

Thus, control valve 80 will move to the right at a speed equal to the differential volume flow divided by the effective control valve piston area. Equation (2) provides the required integration, whereby: (3) $Xv=\int K2(Xc-Xv)dt$ The output pressure is also proportional to the input force and input displacement of the pedal 26 as acting through spring 56. Thus:

(4) $Fi=K3P$, and (5) $Fi=k(Xi-Xc)$

Using Laplace transform notation equations (1), (2), (4) and (5) can be solved for $Xi$, whereby:

(6) $$Xi=\frac{PK3}{k}\left(1+\frac{kS1}{K1K3}\left(\frac{S2}{K2}+1\right)\right)$$

From an examination of equation 6 it can be seen that the apparatus of FIG. 1 will provide output pressure which is a time integral function of input displacement $Xi$ and, of course, of $Xv$. Considering the operation of the structure of the drawing, it can be seen that the motion of the various valves in any one direction will be slight whereby frictional effects will be almost negligible. With such a structure hysteresis effects will therefore be minimized.

While it will be apparent that the preferred embodiment of the invention disclosed is well calculated to fulfill the objects above stated, it will be appreciated that the invention is susceptible to modification, variation and change without departing from the proper scope or fair meaning of the invention.

What is claimed is:

1. A hydraulic brake booster valve actuable by a vehicle operator through a pedal member comprising: control valve means actuable to provide fluid braking pressure at a rate varying in accordance with variations in the magnitude of the displacement of said control valve means, pilot valve means actuable to vary the rate of displacement of said control valve means as a function of the magnitude of the displacement of said pilot valve means, actuating means connected to the pedal member and said pilot valve means for displacing said pilot valve means in response to actuation of the pedal member, said actuating means including a pressure feedback means for providing a force varying in magnitude in accordance with variations in magnitude of the braking pressure and resilient means for transmitting the feedback force from said feedback means to the pedal member.

2. The brake booster valve of claim 1 with said pilot valve means actuable to vary the rate if displacement of said control valve means as a function of the relative displacement of said pilot valve means relative to said control valve means.

3. The brake booster valve of claim 2 operable with a source of fluid pressure with said control valve means being displaced by fluid from the source and with the rate of displacement of said control valve means varying in accordance with the rate of fluid flow from the source acting on said control valve means, said pilot valve means comprising a first pilot throttle valve movable to vary the rate of fluid flow acting on said control valve means in accordance with the relative displacement of said pilot throttle valve.

4. The brake booster valve of claim 3 with said control valve means comprising a control throttle valve movable to vary the rate of flow of fluid for braking pressure from the source in accordance with the displacement of said control throttle valve.

5. The brake booster valve of claim 4 further comprising a housing having a plurality of fluid chambers, said control valve means comprising a control valve body carrying said control throttle valve with said control valve body being slidably supported in one of said chambers, said control valve body including a bleed port communicating said one of said chambers on opposite sides of said control valve body, means communicating one side of said one of said chambers to the high-pressure side of the source, said control valve body including a pilot port communicating the other side of said one of said chambers with a second chamber connected to the return side of the source, said pilot valve means comprising a pilot valve body mounted with said control valve body for relative movement therewith, said pilot valve body carrying said pilot throttle valve located in said second chamber for cooperation with said pilot port for controllably varying the fluid flow therethrough, a feedback chamber communicable with said one of said chambers with the fluid flow to said feedback chamber being controlled by said control throttle valve, said pressure feedback means comprising a feedback piston slidably supported in said feedback chamber and actuable for providing the feedback force, said pilot valve body having a passage normally communicating said feedback chamber and said second chamber, said feedback piston being movable to engage said pilot valve body and to block said passage and to displace said pilot valve body to open said pilot throttle valve, said control valve body being movable to open said control throttle valve at a rate which is a function of the flow rate of fluid through said bleed port and said pilot port as affected by the displacement of said pilot throttle valve, and booster piston means actuable in response to the magnitude of fluid pressure in said feedback chamber for applying the brakes at a pressure determined by said magnitude of fluid pressure.

6. The brake booster valve of claim 5 with said resilient means comprising a spring member connected between the pedal member and said feedback piston.

7. The brake booster of claim 5 for actuation of a master cylinder, said booster means comprising a booster piston assembly operable on the master cylinder in response to the magnitude of fluid pressure in said feedback chamber, said piston assembly including a rod member engageable by the brake pedal in the event of failure of the source of fluid pressure whereby the master cylinder can be directly actuated by the vehicle operator through the brake pedal; said feedback piston, said pilot valve body and said control valve body normally being positioned to prevent engagement of said rod member and the brake pedal and being displaced in response to failure of the source to permit such engagement.

8. The brake booster valve of claim 1 further comprising auxiliary means actuable by the pedal to provide pressurized brake pressure, said pilot valve means and control valve means being operable from a source of fluid pressure to normally provide the operative connection between said actuating means and the pedal member which normally maintains the pedal out of actuating position for said auxiliary means; said pilot valve means and control valve means being moveable upon a loss of pressure from the source to permit actuation of said auxiliary means by the brake pedal.

9. A hydraulic brake booster valve operable from a source of fluid pressure having a high- and a low-pressure side and actuable by a vehicle operator through a pedal member comprising: control valve means actuable to provide fluid braking pressure from the source at a rate varying in accordance with variations in the magnitude of the displacement of said control valve means, pilot valve means actuable to vary the rate of displacement of said control valve means as a function of the magnitude of the displacement of said pilot valve means, actuating means connected to the pedal member and said pilot valve means for displacing said pilot valve means in response to actuation of the pedal member, said pilot valve means connected to the high-pressure side of the source and normally urged by fluid from the high-pressure side towards a condition of no displacement relative to said control valve means.

10. A hydraulic brake booster valve operable from a source of fluid pressure having a high and a low-pressure side and actuable by a vehicle operator through a pedal member comprising: control valve means actuable to provide fluid braking pressure from the source at a rate varying in accordance with variations in the magnitude of the displacement of said control valve means, pilot valve means actuable to vary the rate if displacement of said control valve means as a function of the magnitude of the displacement of said pilot valve means, actuating means connected to the pedal member and said pilot valve means for displacing said pilot valve means in response to actuation of the pedal member, said pilot valve means connected to the high-pressure side of the source and normally urged by fluid from the high-pressure side towards a condition of no displacement relative to said control valve means, said control valve means being displaced by fluid from the source and with the rate of displacement of said control valve means varying in accordance with the rate of fluid flow from the source acting on said control valve means, said pilot valve means comprising a first pilot throttle valve movable to vary the rate of fluid flow acting on said control valve means in accordance with the relative displacement of said pilot throttle valve, fluid conduit means connecting said first pilot throttle valve to the high-pressure side of the source for normally urging said first throttle valve towards a condition of no relative displacement.

* * * * *

UNITED STATES PATENT OFFICE
CERTIFICATE OF CORRECTION

Patent No. 3,643,436  Dated February 22, 1972

Inventor(s) Hugh E. Riordan

It is certified that error appears in the above-identified patent and that said Letters Patent are hereby corrected as shown below:

Column 2, line 23, "123" should be -- 124 --; column 3, line 21 "P" should be -- $\dot{P}$ -- (first occurrence); column 3, line 22, "Xv" (first occurrence), should be -- $\dot{X}v$ --; column 3, line 28 "(P)" should be -- $(\ddot{P})$ --; column 3, line 29, "(P)" should be -- $(\dot{P})$ --; column 4, line 18, "if" should be -- of --; column 6, line 9, "if" should be -- of --.

Signed and sealed this 19th day of September 1972.

(SEAL)
Attest:

EDWARD M. FLETCHER, JR.
Attesting Officer

ROBERT GOTTSCHALK
Commissioner of Patents